(12) United States Patent
Mitz

(10) Patent No.: US 11,746,759 B1
(45) Date of Patent: Sep. 5, 2023

(54) SYSTEM AND METHOD FOR STORING AND RELEASING ENERGY

(71) Applicant: Howard S. Mitz, Littleton, NH (US)

(72) Inventor: Howard S. Mitz, Littleton, NH (US)

( * ) Notice: Subject to any disclaimer, the term of this patent is extended or adjusted under 35 U.S.C. 154(b) by 0 days.

(21) Appl. No.: 17/731,836

(22) Filed: Apr. 28, 2022

(51) Int. Cl.
  *F03G 3/00* (2006.01)

(52) U.S. Cl.
  CPC ................................. *F03G 3/094* (2021.08)

(58) Field of Classification Search
  CPC . F03G 3/00; F03G 3/087; F03G 3/094; F03G 7/10; F03G 7/104; F03G 7/115
  See application file for complete search history.

(56) References Cited

U.S. PATENT DOCUMENTS

| | | | | |
|---|---|---|---|---|
| 4,538,415 A * | 9/1985 | Lebecque | ............. | F03B 17/005 60/398 |
| 8,112,992 B2 * | 2/2012 | Pirincci | ................... | F03B 17/04 60/495 |
| 9,878,873 B2 * | 1/2018 | Gordon | ...................... | F03G 3/00 |
| 2015/0086320 A1 * | 3/2015 | Camp | ........................ | B66F 1/06 414/800 |
| 2020/0109703 A1 * | 4/2020 | Bhargava | ............. | H02K 7/1853 |
| 2021/0291193 A1 * | 9/2021 | Schwartz | ................ | B02C 7/188 |

FOREIGN PATENT DOCUMENTS

| | | | | | |
|---|---|---|---|---|---|
| CN | 113898545 A | * | 1/2022 | | |
| CN | 114576114 A | * | 6/2022 | | |
| CN | 114909268 A | * | 8/2022 | | |
| DE | 4135440 A1 | * | 4/1993 | ............... | F03G 3/00 |
| EP | 3115605 A1 | * | 1/2017 | ............... | F03G 3/00 |
| GB | 2594526 A | * | 11/2021 | ............. | F03G 3/094 |
| KR | 20140027927 A | * | 3/2014 | | |
| WO | WO-2020040717 A1 | * | 2/2020 | | |

* cited by examiner

*Primary Examiner* — Phillip A Johnson
(74) *Attorney, Agent, or Firm* — PRETI FLAHERTY BELIVEAU & PACHIOS, LLP

(57) ABSTRACT

An energy storage and generation device is coupled to a source of energy, preferably green energy, and an energy storage and generation elevator that is configured for allowing the raising and lowering of one or more weights disposed on the energy storage and generation elevator from a lower position to a raised position, the raised position higher than the lower position. A first energy and storage elevator movement mechanism is configured for raising and lowering the energy storage and generation elevator while a second energy and storage elevator movement mechanism is configured for causing the energy generator to generate electrical energy when the energy storage and generation elevator including one or more weights moves from the raised position to the lower position with one or more of the weights disposed on the energy storage and generation elevator.

12 Claims, 1 Drawing Sheet

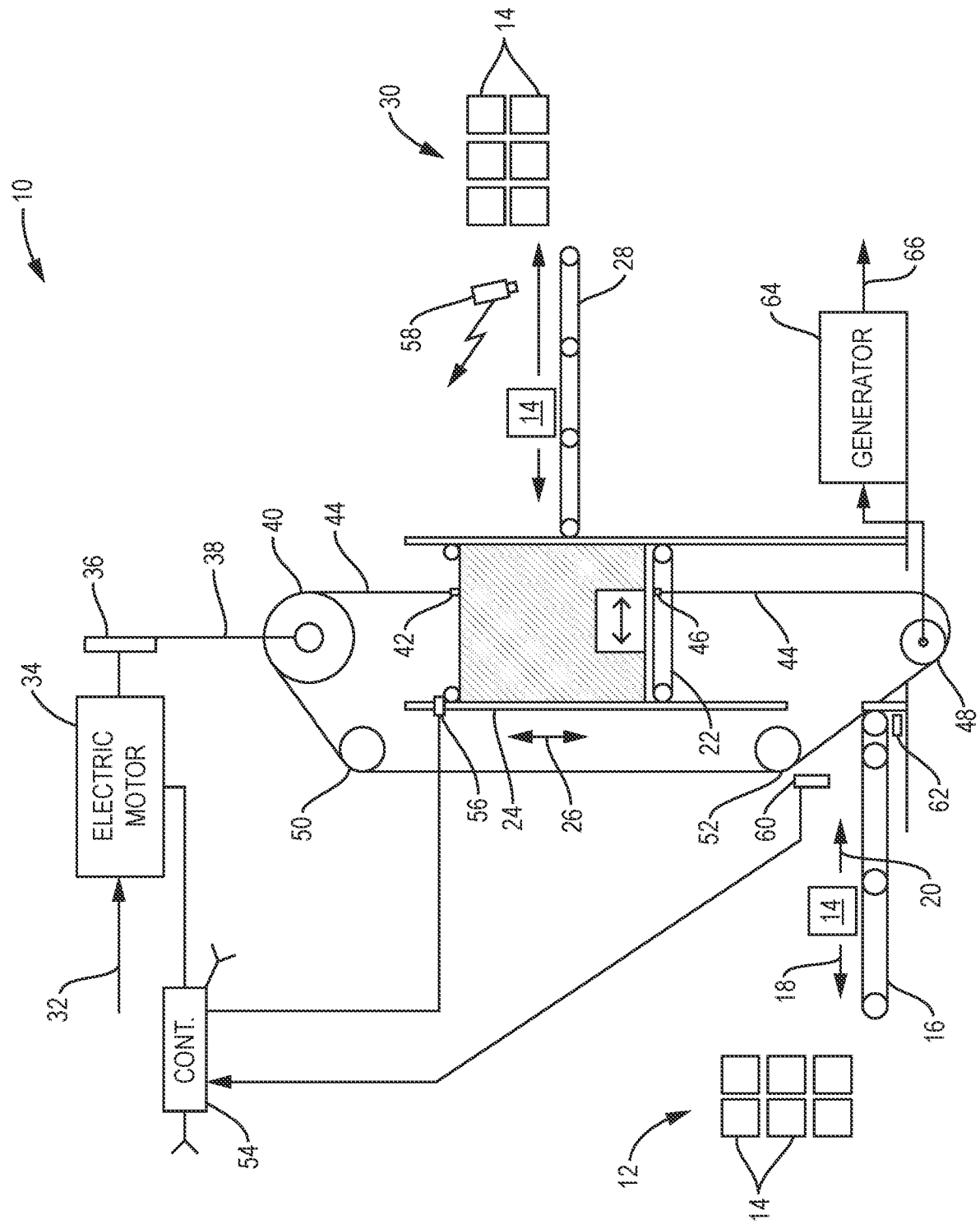

SYSTEM AND METHOD FOR STORING AND RELEASING ENERGY

TECHNICAL FIELD

The present invention relates to a system and method for storing energy and most preferably green energy produced by methods such as wind, solar or waterpower, and for delivering the stored energy upon demand.

BACKGROUND INFORMATION

With the rise in energy demand in every corner of the world, there exists a need for systems and methods to produce energy to meet this increased demand. Given the world's more recent concern with global warming and the production of energy utilizing fossil fuels, there is a significant interest in "green" energy. Green energy is any energy type that is generated from renewable natural resources such as sunlight, wind or water.

Although the production and consumption of green energy is a significant goal, it is the fact that these renewable natural resources are not always present. For example, sunlight is present for only part of a sunny day and absent when the sun is clouded over or during the evening. There is often not enough wind to generate electricity or water may not be flowing with sufficient volume to allow for the generation of this green energy.

Accordingly, what is needed is a system and method for storing a green energy that is produced during times of excessive production and to allow for its use when called for days, weeks or even months later.

SUMMARY OF THE INVENTION

The invention features an energy storage and generation device, comprising an electric motor, coupled to a source of green energy and an energy storage and generation elevator, configured for allowing the raising and lowering of one or more weights disposed on the energy storage and generation elevator from a lower position to a raised position, the raised position higher than the lower position.

The invention further includes a first energy and storage elevator movement mechanism, mechanically coupled to the electric motor and to the energy storage and generation elevator, and configured for raising and lowering the energy storage and generation elevator from one of the raised higher position or the lower position to another one of the raised position or lower position as well as a second energy and storage elevator movement mechanism, mechanically coupled to the energy storage and generation elevator and to an energy generator, and configured for causing the energy generator to generate electrical energy when the energy storage and generation elevator including the one or more weights received from the weight energy storage region disposed at the raised position moves from the raised position to the lower position with one or more of the weights disposed on the energy storage and generation elevator.

In one embodiment, the energy and storage elevator includes a floor region on which the one or more weights are disposed, the floor region configured for mechanically moving the one or more weights from a weight source storage position disposed at the lower position to a weight energy storage region disposed at the raised position. The floor region may include a weight to conveyor mechanism.

In a preferred embodiment, the energy storage and generation device further includes a first weight movement mechanism, disposed proximate the lower position of the energy storage and generation elevator, and configured for receiving the one or more weights from a weight storage region and for transporting the one or more weights to the floor region of the energy and storage elevator, and for receiving the one or more weights from the floor region of the energy storage and generation elevator and for transporting the one or more weights to the weight storage region. The first weight movement mechanism is preferably but not limited to a conveyor.

In the preferred embodiment, the energy storage and generation device further includes a second weight movement mechanism, disposed proximate the raised region of the energy storage and generation elevator and configured for receiving the one or more weights from the floor region and for transporting the one or more weights from the floor region of the energy storage and generation elevator to the weight energy storage position disposed at the raised position of the energy and storage elevator, and for transporting the one or more weights from the weight energy storage position disposed at the raised position of the energy storage and generation elevator to the floor region of the energy and storage elevator. The second weight movement mechanism is preferably but not limited to a conveyor.

In a second preferred embodiment, the energy storage and generation device comprises an electric motor, coupled to a source of green energy and an energy storage and generation elevator, configured for allowing the raising and lowering of one or more weights disposed on the energy storage and generation elevator from a lower position to a raised position, the raised position higher than the lower position, wherein the energy storage and generation elevator includes a floor region on which the one or more weights may be disposed and moved from the lower position to the raised position, the floor region including a weight conveyor mechanism configured for receiving the one or more weights from a weight storage region disposed at the lower position and for providing the one or more weights to a weight energy storage region disposed at the raised position.

The second preferred embodiment further includes a first energy and storage elevator movement mechanism, mechanically coupled to the electric motor and to the energy storage and generation elevator and configured for raising and lowering the energy storage and generation elevator from one of the raised position or a lower position to another one of the raised position or lower position. The second preferred embodiment further includes a second energy and storage elevator movement mechanism, mechanically coupled to the energy storage and generation elevator and to an energy generator, and configured for causing the energy generator to generate electrical energy when the energy storage and generation elevator including the one or more weights received from the weight energy storage region disposed at the raised position moves from the raised position to the lower position with one or more of the weights disposed on the energy storage and generation elevator.

A first weight movement mechanism is disposed proximate the lower position of the energy storage and generation elevator, and configured for receiving the one or more weights from the weight storage region and for transporting the one or more weights to the floor region of the energy storage and generation elevator, and for receiving the one or more weights from the floor region of the energy and storage elevator and for transporting the one or more weights to the weight energy storage region whiles a second weight movement mechanism is disposed proximate the raised region of the energy storage and generation elevator and configured for receiving the one or more weights from the floor region and for transporting the one or more weights from the floor region of the energy and storage elevator to the weight energy storage position disposed at the higher position of the energy and storage elevator, and for transporting the one or more weights from the weight energy storage position disposed at the higher position of the energy and storage elevator to the floor region of the energy and storage elevator.

In the second preferred embodiment, the first and second weight movement mechanisms are preferably but not limited to a conveyor.

BRIEF DESCRIPTION OF THE DRAWINGS

These and other features and advantages of the present invention will be better understood by reading the following detailed description, taken together with the drawings wherein:

FIG. 1 is a diagram of a representative system according to the present invention for carrying out the method of the invention.

DETAILED DESCRIPTION OF THE PREFERRED EMBODIMENTS

The present invention features an exemplary energy storage and generation device 10, FIG. 1 illustrating one system for carrying out the present invention. This is not a limitation as those skilled in the art will understand that changes and substitutions can be made within the scope of the present invention and the claims.

The present invention features, in concept, a store 12 of a quantity of weights 14 which are utilized for energy storage according to the present method. The storage location 12 of weights 14 may be a separate storage area or alternatively, the weights 14 may in fact be stored on a length of loading/unloading conveyor 16. In a first embodiment the weights 14 are moved from their storage location 12 to a loading/unloading conveyor 16 which is configured to move the weights 14 in the direction indicated by arrows 18 and 20. One or more methods utilizing a floor mounted or overhead crane, forklift or other similar method may be utilized to move the weights 14 from their storage location 12 to the loading/unloading conveyor 16. In another embodiment, the weights 14 are simply stored on the loading/unloading conveyor 16 and moved on demand, as will be explained below.

Upon system command and controlled by a manual or automated controller, one or more weights 14 are moved by the loading/unloading conveyor 16 in the direction indicated by arrow 20 and placed on the floor 22 of elevator 24. The floor 22 of the elevator 24 is preferably also a conveyor and allows the loading of weight(s) 14 from the loading/unloading conveyor 16 onto the floor 22 of the elevator 24.

The elevator 24 is configured and designed to move up and down in the direction indicated by arrow 26. Once the elevator 24 is raised to the appropriate raised position, the weight 14 is moved by the elevator floor conveyor 22 to the mass storage conveyor 28 and stored along with other weights 14 either in a weight/mass storage region 30 or remaining directly on the mass storage conveyor 28.

When the system desires to utilize and release the energy stored in the weights 14 either in the weight/mass storage region 30 or on the mass storage conveyor 28, the process is reversed and one or more weights 14 are placed on the mass storage conveyor 28; advanced to the floor 22 of the elevator 24; and the elevator 24 is allowed to descend with the one or more weights 14 while generating electricity during the decent, following which the weight 14 is returned from the elevator floor 22 to the loading/unloading conveyor 16 and ultimately stored for further re-use.

The present invention features a system and method for storing a energy, most preferably green energy, that is produced during times of excessive production and to allow for its use when called for days, weeks or even months later. During times of abundant green energy production, green energy 32 is provided to, for example, electric motor 34 which transforms electrical energy 32 into mechanical energy.

In one non-limiting exemplary embodiment, electric motor 34 includes a flywheel 36 or the like which drives a first cable or pulley 38 to a first elevator flywheel 40. The first elevator flywheel 40 is connected to the top region 42 of the elevator 24. Through a second cable or pulley 44 coupled between the top region 42 of the elevator 24 and a bottom region 46 of elevator 24 by means of a second elevator flywheel 48 and potentially including one or more pulleys 50, 52, and electric motor controller 54 controls the electric motor 34 causing, in a first mode, the elevator to take one or more weights placed on the elevator floor 22 to a storage level higher than the base of the elevator and conveying those weights to the weight/mass storage region 30. When it is desired to utilize or release the energy stored in the form of one or more elevated weights 14, the one or more weights 14 are moved onto the mass storage conveyor 28; placed on the floor 22 of the elevator 24, with the effect of the weight causing the elevator 24 to move downward in a controlled manner/speed. When the elevator 24 moves downward, there is no input energy 32 through electric motor 34 required but gravity acting on the weights simply causes the elevator 24 to move downwardly in a controlled manner.

The controller 54 is typically a preprogrammed or general-purpose system controller utilizing a central processor and running appropriate software to both monitor and control the operation of the system 10. In addition to controlling the speed of the electric motor 34, the controller 54 is also responsive to one or more sensors 56, 58, 60 and 62, for example, to help coordinate the movement of all the relevant portions of the system 10. The sensors may include position sensors, proximity sensors, cameras or any other similar type of sensors which allow the controller 54 to coordinate movement of the weights 14 from the storage location 12 onto the elevator 24 and subsequently to the weight storage region 30 as well as the reverse path when it is desired to utilize the stored weights to generate electricity. Those skilled in the art will know and understand the use of such sensors which may be hardwired to the controller 54 or communicate wirelessly with the controller.

When the elevator moves downwardly, the cable 44 turns the second elevator flywheel 48 which may itself be a generator or may be mechanically coupled to generator 64 which results in electricity 66 being provided by the generator 64 to a building which houses the system 10 or to the electric grid.

Although the present invention is illustrated, for exemplary purposes only, utilizing an electric motor 34 and first cable or pulley 38 to turn the first elevator flywheel 40, the present invention can be carried out in several alternative designs including, for example, coupling motor 34 directly to the first elevator flywheel 40. The present invention envisions utilizing low cost, green energy 32 to cause the elevator 24 to raise weights 14 thereby storing the green energy 32 during times of energy abundance for later release in the form of downward displacement of the elevator 24 utilizing gravity acting on the one or more weights 14 located on the floor 22 of the elevator 24 which will in turn cause generator 64 to generate electricity 66. The energy from the turning of the second elevator flywheel 48 may be sent directly to generator 64 or utilizing the aid of a turbine, capacitor or other device to even the generation of the electricity 66, the electricity 66 is fed back into the building and/or the grid.

Accordingly, what is disclosed and claimed is a system and method for storing energy, and most preferably green energy, that is produced during times of excessive or lower cost production in the form of raising weights to a significant height, and to allow for recapture of this stored energy when called for days, weeks or even months later by allowing the energy stored in the weight(s) at the significant height to be released when the elevator 24 and weights 14 travel downwardly.

It is envisioned that the elevator 24 may be any height (15 stories or more for example) however any height is contemplated keeping in mind that the greater the height, the more energy "storage" can be achieved. The greater the distance between the bottom level of the elevator proximate conveyor 16 and the top level of the elevator proximate conveyor 28, the greater the energy storage potential.

During periods of excessive or reduced cost energy production by any means, for example when the during a storm or even a hurricane; long periods of sun during the summer months; or excessive water flow during a wet season, the energy storage and generation elevator will take one or more weights 14 from a lower region utilizing one or more conveyor belts or other technology and once placed into the elevator 24, the weight will be transported upwardly to the mass storage conveyor 28 and stored there for future use. When there is a call for energy, this cycle is reversed.

The present invention contemplates that the energy storage and generation system 10 may be a stand-alone structure; may be an addition to an existing building (retrofit); or may be located internally and/or added to a new building.

As stated above, the present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. An energy storage and generation device, comprising:
an electric motor, coupled to a source of energy;
an energy storage and generation elevator, configured for allowing the raising and lowering of one or more weights disposed on said energy storage and generation elevator between a lower position and a raised position, said raised position being higher than said lower position;
a first energy and storage generation elevator raising and lowering system, mechanically coupled to said electric motor and to said energy storage and generation elevator, and configured for effectuating and controlling the raising and lowering said energy storage and generation elevator from one of said raised higher position or said lower position to another one of said raised higher position or lower position;
a second energy and storage generation elevator lowering system, mechanically coupled to said energy storage and generation elevator and to an energy generator, and configured for causing said energy generator to generate electrical energy when said energy storage and generation elevator, including said one or more weights received from said weight energy storage region disposed at said raised position, moves from said raised position to said lower position with one or more of said weights disposed on said energy storage and generation elevator.

2. The energy storage and generation device of claim 1, wherein said energy storage and generation elevator includes a floor region on which said one or more weights are disposed, said floor region configured for mechanically moving said one or more weights from a weight source storage region disposed at said lower position to a weight energy storage region disposed at said raised position.

3. The energy storage and generation device of claim 2, wherein said floor region includes a weight conveyor mechanism.

4. The energy storage and generation device of claim 2, further including a first weight movement mechanism, disposed proximate said lower position of said energy storage and generation elevator, and configured for receiving said one or more weights from said weight source storage region and for transporting said one or more weights to said floor region of said energy storage and generation elevator, and for receiving said one or more weights from said floor region of said energy storage and generation elevator and for transporting said one or more weights to said weight source storage region.

5. The energy storage and generation device of claim 4, wherein said first weight movement mechanism is a conveyor.

6. The energy storage and generation device of claim 4, further including a second weight movement mechanism, disposed proximate said raised position of said energy storage and generation elevator and configured for receiving said one or more weights from said floor region of said energy storage and generation elevator and for transporting said one or more weights from said floor region of said energy storage and generation elevator to said weight energy storage region disposed at said raised position of said energy and storage elevator, and for transporting said one or more weights from said weight energy storage region disposed at said raised position of said energy storage and generation elevator to said floor region of said energy storage and generation elevator.

7. The energy storage and generation device of claim 6, wherein said second weight movement mechanism is a conveyor.

8. The energy storage and generation device of claim 1, wherein said a first energy and storage generation elevator raising and lowering system and said second energy and storage generation elevator lowering system includes one of more of the elements selected from the group of elements consisting of one or more of: motor, cable, motor controller, sensor, flywheel and pulley.

9. An energy storage and generation device, comprising:
an electric motor, coupled to a source of energy;
an energy storage and generation elevator, configured for allowing the raising and lowering of one or more weights disposed on a floor region of said energy storage and generation elevator from a lower position to a raised position, said raised position being higher than said lower position, wherein said energy storage and generation elevator includes a floor region on which said one or more weights may be disposed and moved from said lower position to said raised position, said floor region including a weight conveyor mechanism configured for receiving said one or more weights from a weight source storage region disposed at said lower position and for providing said one or more weights to a weight energy storage region disposed at said raised position;

a first energy and storage generation elevator raising and lowering system, mechanically coupled to said electric motor and to said energy storage and generation elevator, and configured for effectuating and controlling the raising and lowering said energy storage and generation elevator from one of said raised higher position or a lower position to another one of said raised higher position or lower position;

a second energy and storage generation elevator lowering system, mechanically coupled to said energy storage and generation elevator and to an energy generator, and configured for causing said energy generator to generate electrical energy when said energy storage and generation elevator, including said one or more weights received from said weight energy storage region disposed at said raised position, moves from said raised position to said lower position with one or more of said weights disposed on said energy storage and generation elevator;

a first weight movement mechanism, disposed proximate said lower position of said energy storage and generation elevator, and configured for receiving said one or more weights from said weight source storage region and for transporting said one or more weights to said floor region of said energy storage and generation elevator, and for receiving said one or more weights from said floor region of said energy and storage elevator and for transporting said one or more weights to said weight source storage region; and a second weight movement mechanism, disposed proximate said raised position of said energy storage and generation elevator and configured for receiving said one or more weights from said floor region of said energy storage and generation elevator, and for transporting said one or more weights from said floor region of said energy and storage elevator to said weight energy storage position disposed at said raised higher position of said energy storage and generation elevator, and for transporting said one or more weights from said weight energy storage position disposed at said raised higher position of said energy storage and generation elevator to said floor region of said energy storage and generation elevator.

10. The energy storage and generation device of claim 9, wherein said first weight movement mechanism is a conveyor.

11. The energy storage and generation device of claim 9, wherein said second weight movement mechanism is a conveyor.

12. The energy storage and generation device of claim 9, wherein said a first energy and storage generation elevator raising and lowering system and said second energy and storage generation elevator lowering system includes one of more of the elements selected from the group of elements consisting of one or more of: motor, cable, motor controller, sensor, flywheel and pulley.

* * * * *